United States Patent
France et al.

(10) Patent No.: US 12,422,146 B2
(45) Date of Patent: Sep. 23, 2025

(54) ADJUSTABLE VENTING SYSTEM

(71) Applicant: Samsung Electronics Co., Ltd., Suwon-si (KR)

(72) Inventors: Ivan France, Saratoga, CA (US); Jun Yeon Cho, San Jose, CA (US); Yufeng Wu, Mountain View, CA (US); William Augustus Workman, San Francisco, CA (US); Eun Seo Cho, Mountain View, CA (US); Stefan van der Hoff, Sunnyvale, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 454 days.

(21) Appl. No.: 17/988,633

(22) Filed: Nov. 16, 2022

(65) Prior Publication Data

US 2024/0159400 A1 May 16, 2024

(51) Int. Cl.
*F24C 15/20* (2006.01)
*G06T 7/30* (2017.01)
*G06V 10/20* (2022.01)

(52) U.S. Cl.
CPC ...... *F24C 15/2042* (2013.01); *F24C 15/2021* (2013.01); *F24C 15/2078* (2013.01); *G06T 7/30* (2017.01); *G06V 10/255* (2022.01); *G06T 2207/10048* (2013.01)

(58) Field of Classification Search
CPC .............. F24C 15/2021; F24C 15/2028; F24C 15/2042; F24C 15/2078
See application file for complete search history.

(56) References Cited

U.S. PATENT DOCUMENTS

| | | |
|---|---|---|
| 9,578,694 B2 | 2/2017 | Meusburger et al. |
| 9,835,339 B2 | 12/2017 | Min |
| 10,082,299 B2 | 9/2018 | Livchak |

(Continued)

FOREIGN PATENT DOCUMENTS

| | | | |
|---|---|---|---|
| CN | 111931658 A | * 11/2020 | .............. F24C 15/20 |
| CN | 112984588 A | * 6/2021 | |

(Continued)

OTHER PUBLICATIONS

Broan, "Range Hoods, Design for Life"; Broan.com, https://www.broan-nutone.com/getmedia/c0db16b1-96ea-491c-bf10-d6dfce6d1540/Broan-under-cabinet-range-hoods-appliance-channel.pdf; 20 pages. Printed in USA, 99851018B, 2019.

(Continued)

*Primary Examiner* — Edelmira Bosques
*Assistant Examiner* — Michael James Giordano

(57) ABSTRACT

In one embodiment, a method includes determining, by a computing device, a location of a source of air contamination associated with a heating element and determining, based at least on the location of the source of air contamination, at least one of an optimal venting location or an optimal venting size of at least one vent of a venting system. The method further includes at least one of: (1) automatically adjusting a respective current location of the at least one vent of the venting system to a respective subsequent location based on the determined optimal venting location; or (2) automatically adjusting a respective current size of the at least one vent of the venting system to a respective subsequent size based on the determined optimal venting size.

20 Claims, 6 Drawing Sheets

(56) References Cited

U.S. PATENT DOCUMENTS

| | | |
|---|---|---|
| 10,302,307 B2 | 5/2019 | Burdett |
| 10,690,353 B2 | 6/2020 | Park et al. |
| 11,067,291 B2 | 7/2021 | Kweon |
| 11,353,218 B2 | 6/2022 | Yoon |
| 2005/0224069 A1 | 10/2005 | Patil |
| 2006/0154590 A1 | 7/2006 | Kanaya |
| 2007/0062513 A1 | 3/2007 | Gagas |
| 2014/0230662 A1 | 8/2014 | Siegel |
| 2021/0123602 A1 | 4/2021 | Heo |
| 2021/0123605 A1 | 4/2021 | Heo |
| 2021/0131937 A1 | 5/2021 | Van Der Sluis |
| 2021/0247074 A1 | 8/2021 | Sinur |
| 2022/0042694 A1 | 2/2022 | He |
| 2022/0113034 A1 | 4/2022 | Moore |
| 2022/0221161 A1 | 7/2022 | Cha |
| 2024/0401831 A1* | 12/2024 | Lloyd ............... F24F 11/77 |

FOREIGN PATENT DOCUMENTS

| | | | |
|---|---|---|---|
| CN | 114543142 A | | 5/2022 |
| JP | 2009186132 A | * | 8/2009 |
| KR | 10-2017-0137335 A | | 12/2017 |
| KR | 20170137335 A | * | 12/2017 |
| KR | 10-2021-0067604 A | | 6/2021 |

OTHER PUBLICATIONS

Final Office Action in U.S. Appl. No. 17/585,340, Jul. 26, 2023.
Non-Final Office Action in U.S. Appl. No. 17/585,340, Feb. 2, 2023.
Non-final Office Action in U.S. Appl. No. 17/585,340, Oct. 13, 2023.
Notice of Allowance in U.S. Appl. No. 17/585,340, Mar. 2024.
PCT Search Report and written opinion in PCT/KR2023/000371, Apr. 7, 2023.

* cited by examiner

ADJUSTABLE VENTING SYSTEM

TECHNICAL FIELD

This application generally relates to a venting system with one or more adjustable vents.

BACKGROUND

Ventilation devices such as residential kitchen exhaust hoods and bathroom exhaust fans are critical to both safety and user experience. Kitchen hoods can both reduce the undesired spread of cooking odors, as well as dangerous pollutants, such as carbon monoxide and formaldehyde, which can be generated by natural gas and propane stoves.

Modern ventilation devices, such as residential cooktop hoods, typically use a stationary fan or fans to generate suction above the range, and typically vent fumes through a duct outside of the building. Many models include a speed control of the ventilating fan, such as "high" and "low" or "high," "medium," and "low." Fan noise increases with fan speed, often making residential ventilation devices too loud to operate at full speed, while being less effective at low speeds.

In a typical ventilation system, a centrifugal (blower) fan is used to generate airflow. These, like most fans, operate at some flow rate (CFM) based on the static pressure of operation. When reducing the cross-sectional area of flow, static pressure will increase slightly and reduce total flow rate along the fan's non-linear performance curve.

DESCRIPTION OF EXAMPLE EMBODIMENTS

Optimal ventilation and removal of airborne contaminants is largely dependent on the relative locations of both a source of ventilation and a source of contamination. For venting in general, higher flow rate and closer positioning of the vent to the source will result in better performance. In welding and soldering, vents may be manually placed next to the source of smoke. This type of ventilation is less common in cooking or in industrial work, where the vent should not obstruct view of the food or workspace and is fixed in place while integrating with standardized mounting and venting infrastructure in a building. For example, a typical residential kitchen hood must account for a source of contamination in any cooking location, and so it covers the whole range area while venting at preset speeds, and offers no adjustment other than fan speed. Such venting systems incentivize use at full fan speed for best performance, which leads to undesirable noise levels and inefficient energy use.

This disclosure describes adjustable venting systems and methods that aim to optimize venting size, location, and/or speed in response to air contamination currently present. As explained more fully herein, these systems increase efficiency and allow a user to either capture more contaminants at maximum speed, or achieve better ventilation at lower fan speeds, which saves power draw and reduces noise levels. For example, a vent with increased flow rate can be optimally placed and sized over a contamination source, in part because reducing the total ventilation area of a venting system does not reduce total flow proportionally. For example, reducing the total area of ventilation of a system to 25% (i.e., a 75% reduction in venting area) may reduce flow by only 16%.

Figure 1:
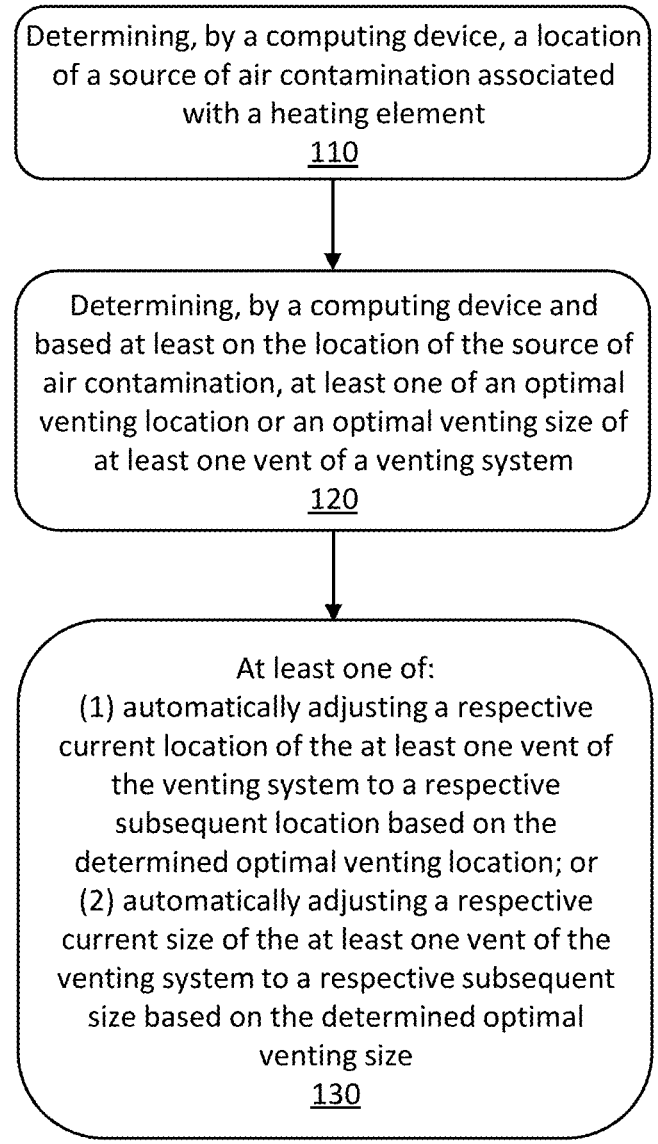
FIG. 1 illustrates an example method for automatically optimizing a venting system in response to current air contamination.
Figure 2:
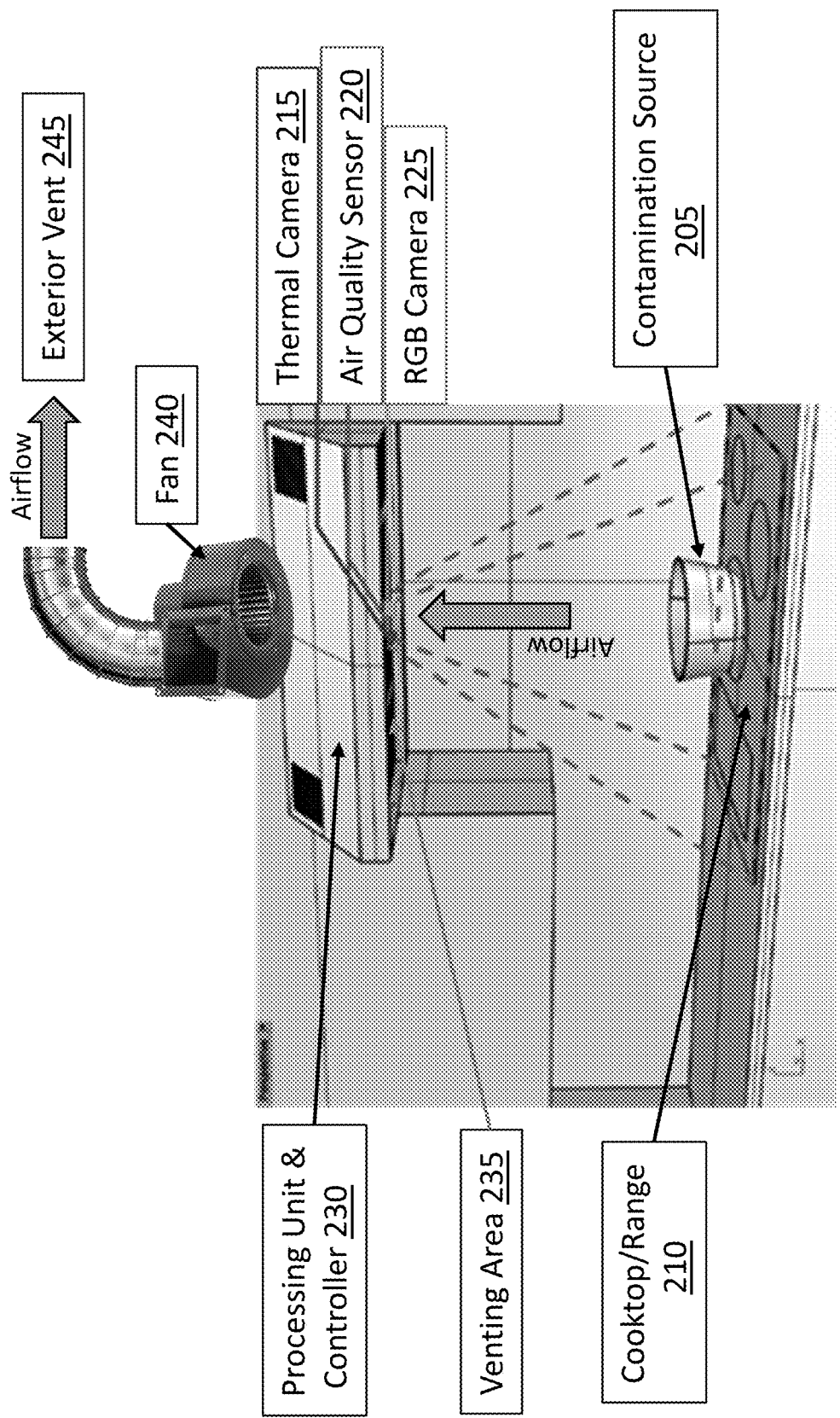
FIG. 2 illustrates an example architecture of an adjustable venting system.

FIG. 1 illustrates an example method for automatically optimizing a venting system in response to current air contamination. At step 110, the method of example FIG. 1 includes determining, by a computing device, a location of a source of air contamination associated with a heating element. FIG. 2 illustrates an example architecture of an adjustable venting system. While FIG. 2 and many of the examples discussed herein relate to a venting system in the context of cooking with an oven range, and the venting system being a range hood, this disclosure contemplates that the venting systems and methods disclosed herein are applicable to any suitable use case, such as in laboratory and industrial settings, welding torches, soldering irons, chemical mixtures, bubbles or splashing, steam-generating appliances, sanders/grinders/generation of airborne dust, paint, or painted surfaces, or bathroom ventilation.

FIG. 2 illustrates a contamination source 205, which is a pot or pan on a cooking surface of an oven including cooktop 210. The example architecture of FIG. 2 includes a number of sensors, such as thermal camera 215, air quality sensor 220, and RGB camera 225. The example architecture of FIG. 2 also includes a processing unit and controller 230, which as explained herein controls the size and location of venting area 235. Processing unit and controller 230 may also control the speed of fan 240, which exhausts airflow via exterior vent 245.

As illustrated in FIG. 2, in step 110 the heating element may be a burner on cooktop range 210, and a source of air contamination may be pot 205. In particular embodiments, step 110 may include determining the location of multiple sources of air contamination, each associated with a heating element. For example, a range typically has multiple burners, and if multiple pots are being used, each providing a source of air contamination, then step 110 may include determining the location of each source.

In particular embodiments, step 110 may include estimating the location of the source of air contamination. This estimated location may be accomplished by, for example, using one or more sensors such the sensors illustrated in the example architecture of FIG. 2. For example, estimating a location of a source of air contamination may include capturing, by an image sensor of the venting system such as RGB camera 225, an image of a heating surface (e.g., range 210), where the heating surface includes the heating element. The system may then identify the source of air contamination from the image, e.g., by extracting features from the image and identifying features as being associated with a source of air contamination. For example, particular embodiments may utilize a shape recognition algorithm, such as a Hough circle transform, for detecting the position and location of a circular pot in the image. The portions of the image that correspond to the circular regions according to the Hough circle transforms may be identified as a pot, and thus identified as a source of air contamination. Additional features may also be used to detect sources of contamination. Based on the image, the location of the pot may then be determined with respect to the heating surface and/or to the venting area, and thus the source of air contamination can be located for use by the steps described below.

While the above discussion describes the example of using a shape-recognition algorithm, this disclosure contemplates any suitable method for locating a source of air contamination. For example, various machine learning methods (e.g., using a convolutional neural network) with an object detection algorithm (such as YOLO, SSD or others) can be trained on a dataset collected with the system. The training data can include varying lighting conditions, varying sources of air contamination such as different kinds of pots, different kinds of food, etc. to detect the location and size of sources of air contamination in an image.

In particular embodiments, sensor input in addition to an optical image (e.g., an RGB image from RGB sensor 225) may be used to locate a source of air contamination. For example, output from thermal camera 215 or air quality sensor 220, or both, may be used to supplement the output of RGB camera 225 to locate a source of air contamination. For example, output from a thermal camera can identify regions that are relatively warm, which can be used to identify the source(s) of air contamination, e.g., by aligning the output from an optical camera with the output from the thermal camera. In addition, the output from the thermal camera can be used to determine which pot locations, e.g., as detected by an optical camera, are actually generating air contamination, e.g., by identifying which pots are actually warm and being used to cook. Moreover, thermal output may be used to measure food and pot temperatures, which can inform ventilation adjustments such as fan speed, as described more fully below.

Moreover, an air quality sensor may be used to help determine the locations of air contamination, e.g., by detecting odors and/or particulate matter concentrations during and after cooking, even if there are no pots present or not very much heat is applied. Therefore, in particular embodiments, an air quality sensor may be used to determine whether sources of air contamination are present, and also may be used to help locate such sources and identify the relative amount of air contamination provided by each source, which can be used to inform how optimal venting should be performed. In particular embodiments, other sensors in addition to or in the alternative to thermal sensors and air quality sensors may be used to detect and locate a source of air contamination, such as, e.g., acoustic sensors.

In particular embodiments, step 110 may include determining that location of the source of air contamination corresponds to a predetermined location associated with the heating element. For example, the locations of burners on a cooktop may be predetermined, for example by loading the locations into a memory of a computing device, or may be detected by, e.g., a sensor such as RGB camera 225 and/or thermal camera 215 that captures images of the range surface and the burner locations. Then, sources of air contamination may be identified, as explained more fully above, and the location of the source of air contamination may then be mapped to the closest corresponding predetermined location, e.g., the closest known location of a burner on the cooktop surface.

Step 120 of the example method of FIG. 1 may include determining, by a computing device and based at least on the location of the source of air contamination, at least one of an optimal venting location or an optimal venting size of at least one vent of a venting system. For example, in the context of the example architecture of FIG. 2, a processing unit may be used to identify the location of the source(s) of air contamination and, as explained more fully herein, use those locations to determine an optimal ventilation configuration for a corresponding venting system. In particular embodiments, the optimal venting configuration may include one or more of an optimal ventilation area, an optimal ventilation location (which may include multiple discrete locations within the venting area), and an optimal fan speed.

In particular embodiments, for example as illustrated in the architecture of FIG. 2, a venting system may include one or more vents arranged in a two-dimensional plane parallel to a surface that includes the heating element. For example, in FIG. 2, venting area 235 is essentially planar and parallel to range 210, which contains the burners (heating elements) that cause air contamination. This disclosure contemplates, however, that the systems and methods disclosed herein may include a venting area having other shapes, such as a more curved surface shape than a planar surface shape.

The venting area of a venting system may include one or more adjustable vents that are automatically adjustable. For example, in the architecture of FIG. 2, processor and controller 230 may determine the appropriate venting size and positions and adjust the vent(s) of venting area 235 accordingly. In particular embodiments, then, the vents of a venting system may be motorized and controlled by the computing components of the venting system. In particular embodiments, some or all of the computing power, and therefore the processing described herein, may be provided by hardware that is outside of the venting system, for example by a computing device in the cloud or by a user's local computing device that is connected via a data channel to the venting system.

In particular embodiments, when two or more vents are present in a venting system, each vent may be adjustable independent from any other vent. For example, FIGS. 3A-D illustrate a venting system that has a venting area that includes two vents, vent 315 and 320. FIGS. 3A-3D also illustrate a range 310. In the example, of FIGS. 3A-D, the venting system also includes a divider 330 that separates vent 315 from 320.

Figure 3A:
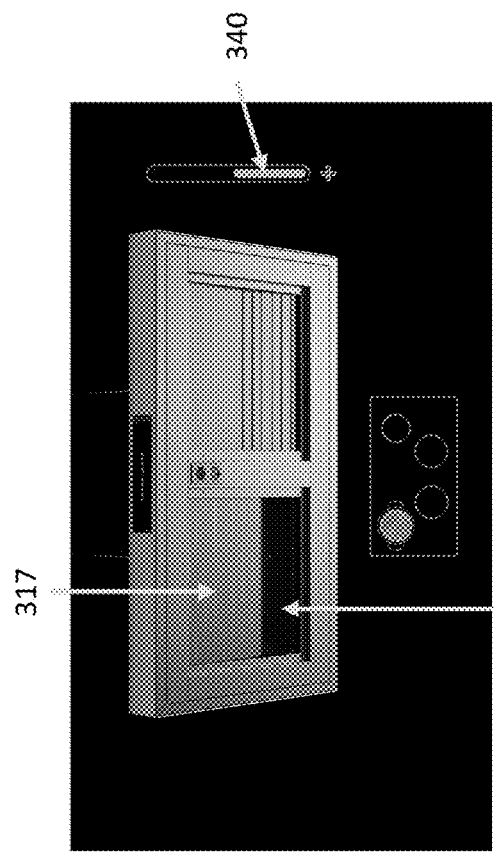
FIGS. 3A, 3B, 3C, and 3D illustrate a venting system that has a venting area that includes two adjustable vents.
Figure 3B:
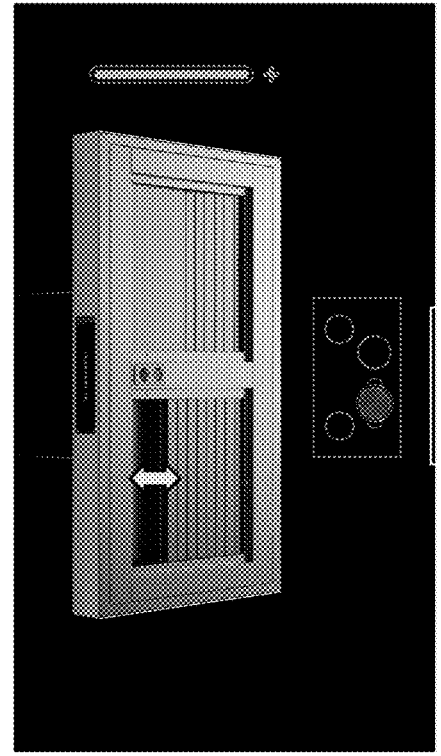
Figure 3C:
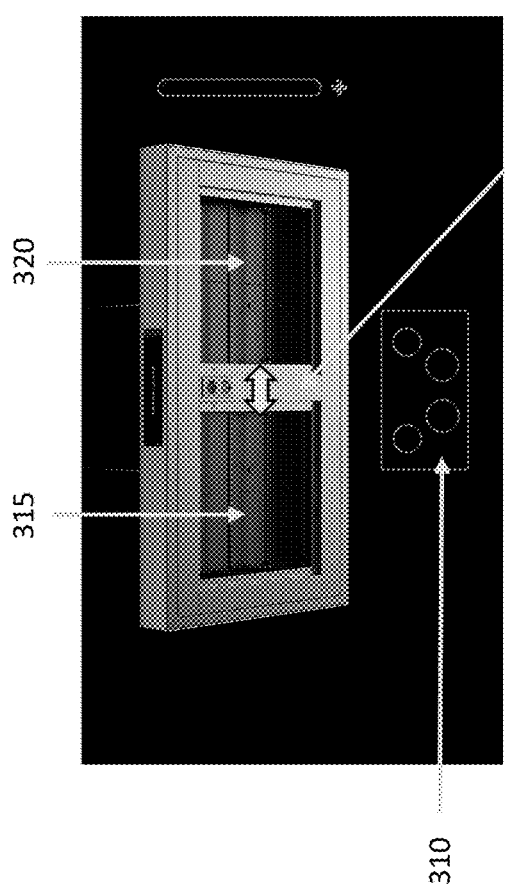
Figure 3D:
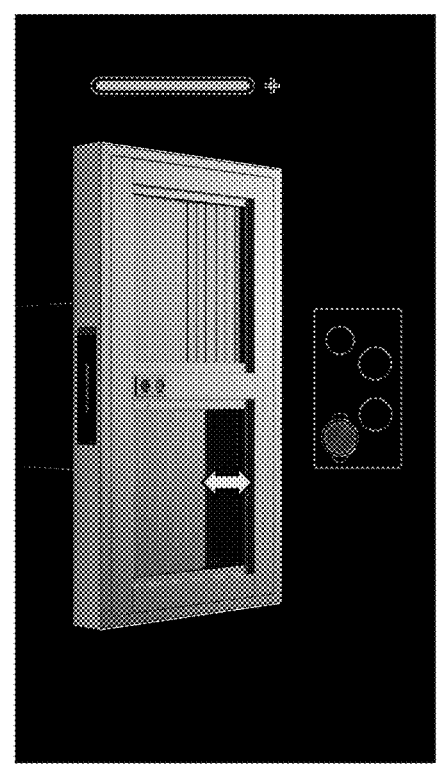

As shown in the example of FIGS. 3A-D, each of vents 315 and 320 are independently adjustable. For example, in FIG. 3A each vent is completely open. FIG. 3B illustrates that vent 320 is closed while vent 315 is partially open, such that air is drawn through region 316 of vent 315 while air is not drawn through closed region 317. As illustrated in FIG. 3B, and as explained more fully herein, this venting configuration may be appropriate when a single source of air contamination, e.g., a pot, is present on the back left burner of range 310. FIG. 3C illustrates how vent 315 (and vent 320) can be adjusted so that region 316 can be expanded or decreased. Moreover, as shown in FIG. 3D, vent 315 is adjusted so that region 317 may be opened while region 316 may be independently closed. As shown in FIG. 3D, this configuration may be suitable when the source of contamination moves from the back-left burner of range 310 to the front-left burner of range 310. FIG. 3B also illustrates relative fan-speed indicator 340, and FIGS. 3A, 3C, and 3D illustrate example fan speeds associated with the various venting configurations of those figures.

As illustrated by the examples of FIGS. 3A-D, each vent of a venting system may be independently adjustable. Moreover, as illustrated in that example, each vent may also have multiple, independent adjustments. For example, each end of vents 315 and 320 are independently adjustable, such that either end may be independently opened by any amount.

Moreover, both ends may be opened at the same time, such that only a region between each end is closed off. In addition, as illustrated in FIG. 3A, a divider 330 may be adjustable, for example in a dimension perpendicular to a dimension in which the vents themselves are adjustable. For instance, in the example of FIG. 3A, divider 330 is adjustable from side to side, perpendicular to the dimension in which vents 315 is adjusted in FIGS. 3B, 3C, and 3D. In particular embodiments, divider 330 may increase the size of one vent while decreasing the size of another vent. In other embodiments, divider region 330 may include adjustments that change the location and/or size of the divider, such that the size of vent 315 may be decreased without changing the size of vent 320, for example by moving a covering on the left of divider 330 over a portion of vent 315, thereby increasing the size of divider 330.

In particular embodiments, vents may have more than a single cover. For instance, returning to the example of FIGS. 3B, vent 315 may include a cover that can extend from the end of region 316 to reduce the size of region 316 while retaining an open area in the middle of the vent. Each end of each vent in the example of FIGS. 3A-D may likewise be adjustable. In particular embodiments, each side of each vent may also be independent adjustable. For example, in FIG. 3B a cover on the left side of vent 315 may be adjustable, e.g., to reduce the size of region 316. Thus, in embodiments in which divider 330 is also adjustable, the example venting system of FIGS. 3A-3D would be able to create any rectangular venting area within the boundaries of the overall venting area of the system.

While the example of FIGS. 3A-D illustrates a venting area of a particular shape and illustrates two vents each having a particular (rectangular) shape, this disclosure contemplates that a venting system may have any suitable number of vents of any suitable (and not necessarily all the same) shape. In addition, vents may be adjustable by any suitable mechanism. For example, a vent may include one or more flexible roll of mesh or a thin sheet metal that can be rolled or unrolled, e.g., from an end of the vent, to cover various parts of that vent's venting area. As another example, an adjustable shutter design for a vent may include control in a radial and/or angular direction. For example, shutters may have variable aperture openings and may be placed above each burner of a range. Moreover, the locations (independently from the sizes) of each vent may be configured, automatically or by a user, to correspond (i.e., be centered directly above) the burner locations of the range. As this example illustrates, in general both the size of a vent and the location of the vent may be independently and automatically adjustable.

In particular embodiments, a venting system may use continuous mechanisms or discrete mechanisms, or a combination therefore, to adjust ventilation size or ventilation area, or both. In particular embodiments, such systems may be actuated in either a linear or axial way. As one example of a continuously adjustable system, FIGS. 3A-D illustrate independent shutters that can slide back and forth to open or close off ventilation areas. As described above in connection with that example, in particular embodiments each shutter can be controlled independently along the distal/proximal axis from the user, or along the left/right axis, or both, and the fixed axis (i.e., divider 330) could be set either automatically by, e.g., the venting system, or manually by a user. Moreover, this disclosure contemplates that even in fully automated or actuated systems, manual adjustment of the size and position of each venting may also be available to a user.

A venting system with fixed or semi-fixed location controls can simplify controls and the processing necessary to determine an optimal location and size for the vents in the venting system. For example, such as system may use axial controls by using axial on/off vents. Discrete control can also be applied in a linear or zone mechanism. For example, if the vents in FIG. 3A did not slide up or down, but instead had shutters that could open and close by variable amounts, then such as system would be an example of a fixed or semi-fixed system. As another example, a simple venting system may include binary on/off, or open/closed, controls for each venting location. For example, a system may divide the venting area into quadrants, and each quadrant may be in either an open state or a shut state.

As illustrated in FIG. 1, the example method of FIG. 1 includes at least one of step 130 or step 140, and may include both. Step 130 includes automatically adjusting a respective current location of at least one vent of the venting system to a respective subsequent location based on the determined optimal venting location, while step 140 includes automatically adjusting a respective current size of at least one vent of the venting system to a respective subsequent size based on the determined optimal venting size. This disclosure contemplates that, in particular embodiments and as described more fully herein, automatically adjusting the current location or size of a vent may include confirming that the current location or size of the vent is the correct location or size of that vent, even if the vent is not physically moved.

Returning the example of FIG. 1, in particular embodiments after a source of air contamination is located, the optimal location of a vent may be determined to be directly above the source of air contamination, and step 130 may include adjusting the location of a vent to be directly above the source of air contamination, as located in step 110. For example, if the source of air contamination results from heating cookware such as a pot or pan, then optimal location in step 120 may be determined to be directly above the pot or pan, and step 130 may include locating a vent directly above the pot or pan, within the constraints of the overall available venting area, (e.g., if directly above the pot or pan is not within the venting area, then step 130 may include choosing the closest available location). In particular embodiments, sensor information (e.g., from an air quality sensor) may be used to determine, for example, the direction of flow of the air contamination, and such information may be used to determine the optimal location of a vent, e.g., as in step 120. For example, if the air contamination is being blown or directed substantially to the side, then optimal location of a vent may be shifted accordingly from a location directly above the source of air contamination, and step 130 may then include location a vent in accordance with this determined optimal location.

In particular embodiments, the optimal size of a vent, e.g., as determined in step 120, may correspond to the size of the source of air contamination. For example, if the source of air contamination results from heating cookware such as a pot or pan, then optimal size in step 120 may be determined to be the size of the pot or pan, and step 130 may include sizing a vent to be at least the size of the pot or pan, within the constraints of the overall available venting area, (e.g., if the vents are not capable of matching the shape of the pot or pan, then the vent's size may account for available shapes, as described more fully below). In this example, if a venting system included multiple vents and there was only one source of air contamination (i.e., one pot or pan), then one vent may be located directly above the pot or pan and sized to be at least as large as the pot or pan, and the other vents may be completely closed, therefore optimizing the venting system's venting capabilities to the specific arrangement of the air contamination currently present in the environment. However, if there are multiple sources of air contamination, then in particular embodiments one vent could be used to cover both sources, or two vents could be used, depending on the available configurations of the vent and the arrangement of the sources of air contamination.

Figure 4:
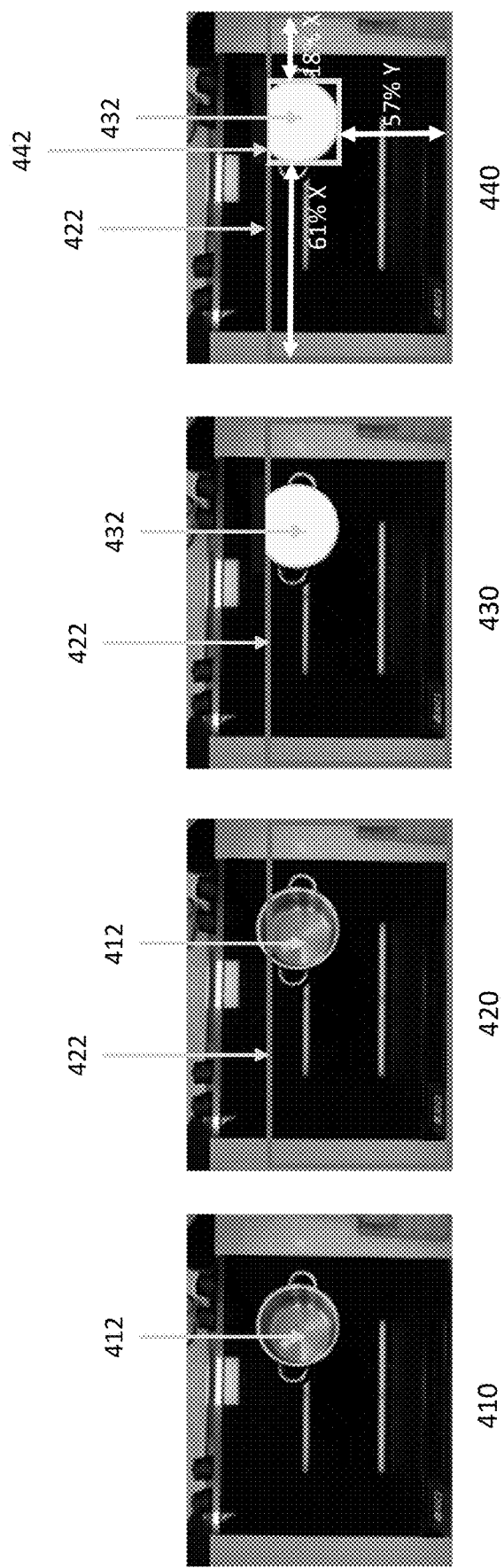
FIG. 4 illustrates an example embodiment of steps 130 and 140 of the example method of FIG. 1.

FIG. 4 illustrates an example embodiment of steps 130 and 140 of the example method of FIG. 1. First, the venting system may determine the size and location of each source of air contamination. For example, as shown in image 410, the source of air contamination is a single pot 412, and the system determines the location and size of the pot, as described more fully herein. Next, the system determines the venting area available to the system. For example, image 420 illustrates boundary 422, and within boundary 422 is the available venting area of the system. As shown in image 422, a portion of pot 412 is within boundary 422 and a portion of pot 412 is outside of boundary 422. Determining the ventilation area may be based on a preset (e.g., factory) calibration, based on a user calibration of the cooktop area, based on using sensors to detect the distance and FOV of the camera, or based on an active sensing method (such as shining lasers straight down from portions of the edges (e.g., corners) of the hood and detecting the corner locations with a camera).

For each source of air contamination previously detected, then in this example the system finds the intersection of that source of air contamination and the venting area. For example, image 430 illustrates intersection 432 identifying the portion of pot 412 that is within boundary 422 of the system's venting area. After identifying the intersection for a particular source of air contamination, then system may then calculate a bounding box that defines the optimal size of a vent for that source of air contamination. For example, image 440 illustrates bounding box 442, which is sized so that intersection 432 is within bounding box 442. In particular embodiment, the shape of the bounding box may take the available shapes of the venting system. For example, while image 440 illustrates a rectangular bounding box, a venting system that used circular vents may use circular bounding boxes, while a venting system that can create more arbitrary shapes may then use bounding boxes that match the shape of the source of air contamination.

Once a bounding box is determined, the system may then determine a target location and size of a vent. In particular embodiments, these specifications may be determined with respect to the venting system's coordinate frame. For example, as shown in image 440, bounding box 442 is defined with respect to the relative distances of the sides of the box from the edges of system's venting area, as defined by boundary 422.

In particular embodiments, the size or location (or both) of a vent may be adjusted after steps 130 and/or 140 are performed. For example, with respect to the example of FIG. 4, after a vent is sized and positioned as identified in image 440 and as explained above, a sensor such as an air quality sensor may detect an amount of contamination. The air quality sensor may be part of the venting system (e.g., part of a hood range) or may be apart from but in the same environment (e.g., it may be in the kitchen but not part of the hood range). The size or location (or both) of a vent may be incrementally adjusted while the amount of contamination is tracked. A final size or location of the vent may determine based on the adjustments and the tracked amount of contamination. For example, the final size of the vent may be the size at which the air contamination was minimized. As another example, the final size may be the size at which air contamination begins increasing, relative to the previous size (i.e., the vent may be resized until the amount of air contamination begins to increase). In particular embodiments, a vent may first be re-sized by increasing the size of the vent.

Figure 5:
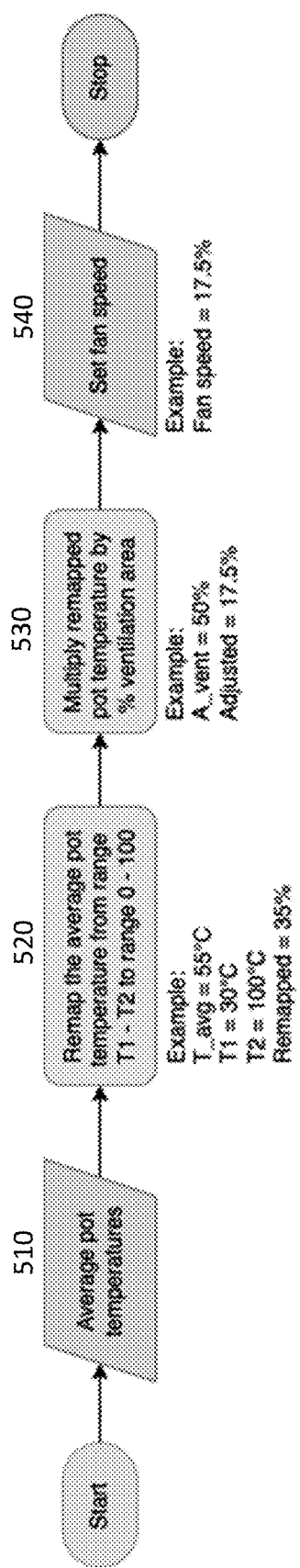
FIG. 5 illustrates an example approach for varying fan speed using output from a thermal sensor.

In particular embodiments, a venting system may determine an optimal fan speed for the current conditions and may adjust the speed of a venting fan accordingly. In particular embodiments, sensor input (e.g., from an optical camera, thermal camera, etc.) may be used to determine the optimal fan speed. For example, a system may allow a user to manually set a suction level (e.g., such as high/medium/low), and then change the fan speed in proportion with the area of the ventilation used. For example, if the medium suction level corresponds to, e.g., 50% fan speed when the ventilation is fully open, the fan speed could decrease linearly to, e.g., 25% fan speed as the ventilation size is reduced to the smallest open area. As another example, a venting system may incorporate sensors data (such as from a thermal camera or a air quality sensor) and vary the fan speed based on the sensor measurements. FIG. 5 illustrates an example of this approach using output from a thermal sensor, but that same approach may be used with, e.g., an air quality sensor. At step 510, the system may measure the average pot temperature. At step 520, the system remaps the average pot temperature from a range T1-T2 to a range of 0-100. T1 and T2 may be predetermined in advance, for example using the specific numbers shown in FIG. 5. The resulting output is the average pot temperature expressed as a percentage of the range 0-100.

At step 530, the system multiplies the remapped temperature values by the percentage of the venting system's ventilation area that is in use. The resulting percentage is then used to set the fan speed as a percentage of the fan's full speed, as illustrated in step 540. In particular embodiments, a venting system may use the temperature of the exhaust to determine a fan speed, e.g., to avoid damaging the venting system with exhaust that is too hot.

In particular embodiments, after the method of FIG. 1 is performed, the venting system may monitor the area, e.g., a cooktop surface, to determine whether a source of air contamination has changed, for example whether the source of air contamination has moved or whether a new source of air contamination is present in the area. If the source of air contamination has moved or a new source of air contamination is present in the area, then the procedure of FIG. 1 may be re-executed. For example, if a new source of air contamination is detected, then the location of the source(s) of air contamination may be detected and venting sizes or locations (or both) set based on determining optimal sizes and locations. Therefore, each time the source of air contamination changes, a venting system in these embodiments is able to adaptively adjust the system' venting to optimize removal of the air contamination. In addition, as explained above, such adjustments do not require moving the fan used to perform venting or moving the entire venting system, which is impractical for many kinds of residential venting systems.

Particular embodiments may repeat one or more steps of the method of FIG. 1, where appropriate. Although this disclosure describes and illustrates particular steps of the method of FIG. 1 as occurring in a particular order, this disclosure contemplates any suitable steps of the method of FIG. 1 occurring in any suitable order. Moreover, although this disclosure describes and illustrates particular components, devices, or systems carrying out particular steps of the method of FIG. 1, such as the computer system of FIG. 6, this disclosure contemplates any suitable combination of any suitable components, devices, or systems carrying out any suitable steps of the method of FIG. 1. Moreover, this disclosure contemplates that some or all of the computing operations described herein, including the steps of the example method illustrated in FIG. 1, may be performed by circuitry of a computing device, for example the computing device of FIG. 6, by a processor coupled to non-transitory computer readable storage media, or any suitable combination thereof.

Figure 6:
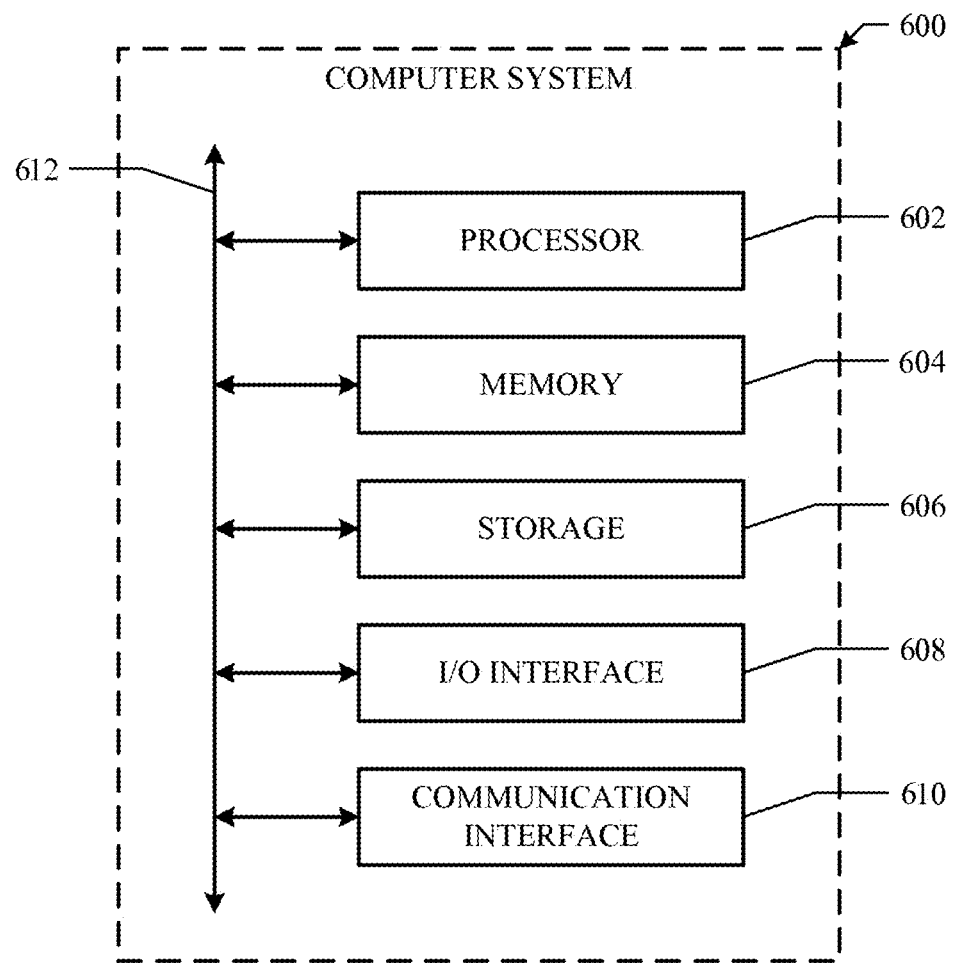
FIG. 6 illustrates an example computing device.

FIG. 6 illustrates an example computer system 600. In particular embodiments, one or more computer systems 600 perform one or more steps of one or more methods described or illustrated herein. In particular embodiments, one or more computer systems 600 provide functionality described or illustrated herein. In particular embodiments, software running on one or more computer systems 600 performs one or more steps of one or more methods described or illustrated herein or provides functionality described or illustrated herein. Particular embodiments include one or more portions of one or more computer systems 600. Herein, reference to a computer system may encompass a computing device, and vice versa, where appropriate. Moreover, reference to a computer system may encompass one or more computer systems, where appropriate.

This disclosure contemplates any suitable number of computer systems 600. This disclosure contemplates computer system 600 taking any suitable physical form. As example and not by way of limitation, computer system 600 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, or a combination of two or more of these. Where appropriate, computer system 600 may include one or more computer systems 600; be unitary or distributed; span multiple locations; span multiple machines; span multiple data centers; or reside in a cloud, which may include one or more cloud components in one or more networks. Where appropriate, one or more computer systems 600 may perform without substantial spatial or temporal limitation one or more steps of one or more methods described or illustrated herein. As an example and not by way of limitation, one or more computer systems 600 may perform in real time or in batch mode one or more steps of one or more methods described or illustrated herein. One or more computer systems 600 may perform at different times or at different locations one or more steps of one or more methods described or illustrated herein, where appropriate.

In particular embodiments, computer system 600 includes a processor 602, memory 604, storage 406, an input/output (I/O) interface 608, a communication interface 610, and a bus 612. Although this disclosure describes and illustrates a particular computer system having a particular number of particular components in a particular arrangement, this disclosure contemplates any suitable computer system having any suitable number of any suitable components in any suitable arrangement.

In particular embodiments, processor 602 includes hardware for executing instructions, such as those making up a computer program. As an example and not by way of limitation, to execute instructions, processor 602 may retrieve (or fetch) the instructions from an internal register, an internal cache, memory 604, or storage 406; decode and execute them; and then write one or more results to an internal register, an internal cache, memory 604, or storage 406. In particular embodiments, processor 602 may include one or more internal caches for data, instructions, or addresses. This disclosure contemplates processor 602 including any suitable number of any suitable internal caches, where appropriate. As an example and not by way of limitation, processor 602 may include one or more instruction caches, one or more data caches, and one or more translation lookaside buffers (TLBs). Instructions in the instruction caches may be copies of instructions in memory 604 or storage 406, and the instruction caches may speed up retrieval of those instructions by processor 602. Data in the data caches may be copies of data in memory 604 or storage 406 for instructions executing at processor 602 to operate on; the results of previous instructions executed at processor 602 for access by subsequent instructions executing at processor 602 or for writing to memory 604 or storage 406; or other suitable data. The data caches may speed up read or write operations by processor 602. The TLBs may speed up virtual-address translation for processor 602. In particular embodiments, processor 602 may include one or more internal registers for data, instructions, or addresses. This disclosure contemplates processor 602 including any suitable number of any suitable internal registers, where appropriate. Where appropriate, processor 602 may include one or more arithmetic logic units (ALUs); be a multi-core processor; or include one or more processors 602. Although this disclosure describes and illustrates a particular processor, this disclosure contemplates any suitable processor.

In particular embodiments, memory 604 includes main memory for storing instructions for processor 602 to execute or data for processor 602 to operate on. As an example and not by way of limitation, computer system 600 may load instructions from storage 406 or another source (such as, for example, another computer system 600) to memory 604. Processor 602 may then load the instructions from memory 604 to an internal register or internal cache. To execute the instructions, processor 602 may retrieve the instructions from the internal register or internal cache and decode them. During or after execution of the instructions, processor 602 may write one or more results (which may be intermediate or final results) to the internal register or internal cache. Processor 602 may then write one or more of those results to memory 604. In particular embodiments, processor 602 executes only instructions in one or more internal registers or internal caches or in memory 604 (as opposed to storage 406 or elsewhere) and operates only on data in one or more internal registers or internal caches or in memory 604 (as opposed to storage 406 or elsewhere). One or more memory buses (which may each include an address bus and a data bus) may couple processor 602 to memory 604. Bus 612 may include one or more memory buses, as described below. In particular embodiments, one or more memory management units (MMUs) reside between processor 602 and memory 604 and facilitate accesses to memory 604 requested by processor 602. In particular embodiments, memory 604 includes random access memory (RAM). This RAM may be volatile memory, where appropriate Where appropriate, this RAM may be dynamic RAM (DRAM) or static RAM (SRAM). Moreover, where appropriate, this RAM may be single-ported or multi-ported RAM. This disclosure contemplates any suitable RAM. Memory 604 may include one or more memories 604, where appropriate.

Although this disclosure describes and illustrates particular memory, this disclosure contemplates any suitable memory.

In particular embodiments, storage 406 includes mass storage for data or instructions. As an example and not by way of limitation, storage 406 may include a hard disk drive (HDD), a floppy disk drive, flash memory, an optical disc, a magneto-optical disc, magnetic tape, or a Universal Serial Bus (USB) drive or a combination of two or more of these. Storage 406 may include removable or non-removable (or fixed) media, where appropriate. Storage 406 may be internal or external to computer system 600, where appropriate. In particular embodiments, storage 406 is non-volatile, solid-state memory. In particular embodiments, storage 406 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 406 taking any suitable physical form. Storage 406 may include one or more storage control units facilitating communication between processor 602 and storage 406, where appropriate. Where appropriate, storage 406 may include one or more storages 406. Although this disclosure describes and illustrates particular storage, this disclosure contemplates any suitable storage.

In particular embodiments, I/O interface 608 includes hardware, software, or both, providing one or more interfaces for communication between computer system 600 and one or more I/O devices. Computer system 600 may include one or more of these I/O devices, where appropriate. One or more of these I/O devices may enable communication between a person and computer system 600. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 608 for them. Where appropriate, I/O interface 608 may include one or more device or software drivers enabling processor 602 to drive one or more of these I/O devices. I/O interface 608 may include one or more I/O interfaces 608, where appropriate. Although this disclosure describes and illustrates a particular I/O interface, this disclosure contemplates any suitable I/O interface.

In particular embodiments, communication interface 610 includes hardware, software, or both providing one or more interfaces for communication (such as, for example, packet-based communication) between computer system 600 and one or more other computer systems 600 or one or more networks. As an example and not by way of limitation, communication interface 610 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 610 for it. As an example and not by way of limitation, computer system 600 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 600 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 600 may include any suitable communication interface 610 for any of these networks, where appropriate. Communication interface 610 may include one or more communication interfaces 610, where appropriate. Although this disclosure describes and illustrates a particular communication interface, this disclosure contemplates any suitable communication interface.

In particular embodiments, bus 612 includes hardware, software, or both coupling components of computer system 600 to each other. As an example and not by way of limitation, bus 612 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 612 may include one or more buses 612, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend.

What is claimed is:

1. A method comprising:
   determining, by a computing device, a location of a source of air contamination associated with a heating element;
   determining, by a computing device and based at least on the location of the source of air contamination, at least one of an optimal venting location or an optimal venting size of at least one vent of a venting system comprising a plurality of vents, wherein (1) each vent is arranged in a two-dimensional plane parallel to a surface comprising the heating element and (2) at least one of a size or location of each vent is independently adjustable in both dimensions of the two-dimensional plane; and
   at least one of:
      automatically adjusting a respective current location of the at least one of the plurality of vents of the venting system to a respective subsequent location based on the determined optimal venting location; or
      automatically adjusting a respective current size of the at least one of the plurality of vents of the venting system to a respective subsequent size based on the determined optimal venting size.

2. The method of claim 1, wherein determining the location of the source of air contamination comprises estimating the location.

3. The method of claim 2, wherein estimating the location comprises:
   capturing, by an image sensor of the venting system, an image of the surface comprising the heating element;
   identifying, in the image, an object comprising the source of air contamination; and
   determining the location of the source of air contamination to be the location of the object.

4. The method of claim 3, wherein identifying an object comprising the source of air contamination comprises:
   capturing, by a thermal camera of the venting system, a thermal image of the heating surface;
   aligning the thermal image with the image of the surface captured by the image sensor; and
   identifying, based on the aligned image, the object in the image.

5. The method of claim 1, wherein determining the location of the source of air contamination comprises determining that location of the source of air contamination corresponds to a predetermined location associated with the heating element.

6. The method of claim 1, wherein:
   the optimal location comprises a location in the two-dimensional plane directly above the source of air contamination; and
   the optimal size comprises at least the size of the source of air contamination.

7. The method of claim 6, further comprising:
   monitoring, by one or more sensors, an air quality in the vicinity of the source of air contamination; and
   adjusting the subsequent size of the at least one vent from the optimal size to a final size that is based on the monitored air quality.

8. The method of claim 1, further comprising:
   accessing an image of the surface, wherein the image has an associated field of view;
   determining a size and a location of each source of air contamination that is within the field of view of the image;
   determining a venting area of the venting system;
   for each source of air contamination in the field of view:
      determining an intersection between the source of air contamination and the venting area of the venting system; and
      setting the optimal location and the optimal venting size for that source of air contamination to be equal to the intersection; and
   adjusting one or more of the plurality of vents so that the plurality of vents cover each intersection while minimizing the area covered by the plurality of vents that does not include an intersection.

9. The method of claim 1, further comprising:
   determining an optimal fan speed of at least one fan in the venting system; and
   adjusting the fan speed of the at least one fan in the venting system to be the optimal fan speed.

10. The method of claim 9, wherein the optimal fan speed is based on one or more of:
    a suction level of the venting system input by a user and a ventilation area of the venting system; or
    an average temperature of the source of air contamination over a period of time and the ventilation area of the venting system.

11. The method of claim 1, further comprising:
    monitoring an area comprising the heating element to determine whether the source of air contamination has moved or whether a new source of air contamination is present in the area; and
    in response to a determination that the source of air contamination has moved or that a new source of air contamination is present in the area, then re-executing the steps of claim 1.

12. A venting system comprising:
    a venting fan;
    a plurality of vents, wherein (1) each vent is arranged in a two-dimensional plane parallel to a surface comprising a heating element and (2) at least one of a size or location of each vent is independently adjustable in both dimensions of the two-dimensional plane; and
    one or more processors and a non-transitory computer readable storage media embodying instructions coupled to the one or more processors, the one or more processors operable to execute the instructions to:
       determine a location of a source of air contamination associated with the heating element;
       determine, based at least on the location of the source of air contamination, at least one of an optimal venting location or an optimal venting size of at least one vent of the venting system; and
       at least one of:
          adjust a respective current location of the at least one of the plurality of vents of the venting system to a respective subsequent location based on the determined optimal venting location; or
          adjust a respective current size of the at least one of the plurality of vents of the venting system to a respective subsequent size based on the determined optimal venting size.

13. The system of claim 12, wherein the one or more processors are further operable to execute the instructions to:
monitor an area comprising the heating element to determine whether the source of air contamination has moved or whether a new source of air contamination is present in the area; and
in response to a determination that the source of air contamination has moved or that a new source of air contamination is present in the area, then re-execute the operations of claim 12.

14. One or more non-transitory computer readable storage media embodying instructions and coupled to one or more processors that are operable to execute the instructions to:
determine a location of a source of air contamination associated with a heating element;
determine, based at least on the location of the source of air contamination, at least one of an optimal venting location or an optimal venting size of at least one vent of a venting system comprising a plurality of vents, wherein (1) each vent is arranged in a two-dimensional plane parallel to a surface comprising the heating element and (2) at least one of a size or location of each vent is independently adjustable in both dimensions of the two-dimensional plane; and
at least one of:
automatically adjust a respective current location of the at least one of the plurality of vents of the venting system to a respective subsequent location based on the determined optimal venting location; or
automatically adjust a respective current size of the at least one of the plurality of vents of the venting system to a respective subsequent size based on the determined optimal venting size.

15. The venting system of claim 12, wherein the one or more processors operable to execute the instructions to determine the location of the source of air contamination comprise one or more processors operable to execute the instructions to estimate the location.

16. The venting system of claim 15, further comprising an image sensor, and wherein the one or more processors operable to execute the instructions to estimate the location comprise one or more processors operable to execute the instructions to:
capture, by the image sensor, an image of the surface comprising the heating element;
identify, in the image, an object comprising the source of air contamination; and
determine the location of the source of air contamination to be the location of the object.

17. The venting system of claim 16, further comprising a thermal camera, and wherein the one or more processors operable to execute the instructions to identify the object comprising the source of air contamination comprise one or more processors operable to execute the instructions to:
capture, by the thermal camera, a thermal image of the surface;
align the thermal image with the image of the surface captured by the image sensor; and
identity, based on the aligned image, the object in the image.

18. The venting system of claim 12, wherein:
the optimal location comprises a location in the two-dimensional plane directly above the source of air contamination; and
the optimal size comprises at least the size of the source of air contamination.

19. The venting system of claim 18, further comprising one or more processors operable to execute the instructions to:
monitor, by one or more sensors, an air quality in the vicinity of the source of air contamination; and
adjust the subsequent size of the at least one vent from the optimal size to a final size that is based on the monitored air quality.

20. The venting system of claim 12, further comprising one or more processors operable to execute the instructions to:
access an image of the surface, wherein the image has an associated field of view;
determine a size and a location of each source of air contamination that is within the field of view of the image;
determine a venting area of the venting system;
for each source of air contamination in the field of view:
determine an intersection between the source of air contamination and the venting area of the venting system; and
set the optimal location and the optimal venting size for that source of air contamination to be equal to the intersection; and
adjust one or more of the plurality of vents so that the plurality of vents cover each intersection while minimizing the area covered by the plurality of vents that does not include an intersection.

* * * * *